United States Patent
Heyrman et al.

(10) Patent No.: US 8,407,515 B2
(45) Date of Patent: Mar. 26, 2013

(54) PARTITION TRANSPARENT MEMORY ERROR HANDLING IN A LOGICALLY PARTITIONED COMPUTER SYSTEM WITH MIRRORED MEMORY

(75) Inventors: Peter Joseph Heyrman, Rochester, MN (US); Naresh Nayar, Rochester, MN (US); Gary Ross Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 1214 days.

(21) Appl. No.: 12/115,625

(22) Filed: May 6, 2008

(65) Prior Publication Data
US 2009/0282300 A1 Nov. 12, 2009

(51) Int. Cl.
*G06F 11/00* (2006.01)
(52) U.S. Cl. .................. 714/6.12; 714/6.23; 714/6.32
(58) Field of Classification Search ............... 714/6.12, 714/6.23, 6.32, 47.2
See application file for complete search history.

(56) References Cited

U.S. PATENT DOCUMENTS

| | | | | |
|---|---|---|---|---|
| 5,267,242 A * | 11/1993 | Lavallee et al. | | 714/6.32 |
| 5,564,040 A * | 10/1996 | Kubala | | 711/173 |
| 5,680,570 A * | 10/1997 | Rantala et al. | | 711/113 |
| 6,075,938 A | 6/2000 | Bugnion et al. | | |
| 6,604,177 B1 * | 8/2003 | Kondo et al. | | 711/150 |
| 7,028,216 B2 * | 4/2006 | Aizawa et al. | | 714/6.32 |
| 7,058,782 B2 * | 6/2006 | Henderson et al. | | 711/170 |
| 7,313,721 B2 * | 12/2007 | Ashmore | | 714/6.32 |
| 7,444,543 B2 * | 10/2008 | Babudri et al. | | 714/6.32 |
| 7,447,938 B1 * | 11/2008 | Coatney | | 714/6.32 |
| 7,478,268 B2 * | 1/2009 | Henderson et al. | | 714/5.11 |
| 7,484,208 B1 | 1/2009 | Nelson | | |
| 7,555,677 B1 * | 6/2009 | Wiley et al. | | 714/36 |
| 2005/0028039 A1 | 2/2005 | Henderson et al. | | |
| 2006/0236165 A1 | 10/2006 | Cepulis et al. | | |
| 2007/0061612 A1 * | 3/2007 | Henderson et al. | | 714/5 |
| 2007/0288720 A1 | 12/2007 | Cholleti et al. | | |
| 2008/0005495 A1 | 1/2008 | Lowe et al. | | |
| 2008/0147945 A1 | 6/2008 | Zimmer et al. | | |
| 2008/0235477 A1 | 9/2008 | Rawson | | |
| 2009/0043985 A1 | 2/2009 | Tuuk et al. | | |
| 2009/0063835 A1 | 3/2009 | Yao et al. | | |
| 2009/0216985 A1 * | 8/2009 | O'Connor et al. | | 711/170 |
| 2009/0249366 A1 | 10/2009 | Sen et al. | | |

* cited by examiner

*Primary Examiner* — Scott Baderman
*Assistant Examiner* — Elmira Mehrmanesh
(74) *Attorney, Agent, or Firm* — Martin & Associates, LLC; Bret J. Petersen (57) ABSTRACT

A method and apparatus for transparently handling recurring correctable errors and uncorrectable errors in a mirrored memory system prevents costly system shutdowns for correctable memory errors or system failures from uncorrectable memory errors. When a high number of correctable errors are detected for a given memory location, a memory relocation mechanism in the hypervisor moves the data associated with the memory location to an alternate physical memory location transparently to the partition such that the partition has no knowledge that the physical memory actualizing the memory location has been changed. When a correctable error occurs, the memory relocation mechanism uses data from a partner mirrored memory block as a data source for the memory block with the uncorrectable error and then relocates the data to a newly allocated memory block to replace the memory block with the uncorrectable error.

16 Claims, 10 Drawing Sheets

PARTITION TRANSPARENT MEMORY ERROR HANDLING IN A LOGICALLY PARTITIONED COMPUTER SYSTEM WITH MIRRORED MEMORY

CROSS REFERENCE TO RELATED APPLICATION

This application is related to a co-filed application, U.S. application Ser. No. 12/115,613 by the same inventors herein and titled "Partition Transparent Correctable Error Handling In A Logically Partitioned Computer System".

BACKGROUND

1. Technical Field

This disclosure generally relates to multi-partition computer systems, and more specifically relates to transparent correctable error handling in a logically partitioned computer system.

2. Background Art

Computer systems typically include a combination of hardware and software. The combination of hardware and software on a particular computer system defines a computing environment. It was recognized that it is possible to provide different computing environments on the same physical computer system by logically partitioning the computer system resources into different computing environments. The logical portioning allows multiple operating systems and processes to share the hardware resources of a host computer. The eServer computer system developed by International Business Machines Corporation (IBM) is an example of a computer system that supports logical partitioning. For logical partitioning on an eServer computer system, a firmware partition manager called a "hypervisor" allows defining different computing environments on the same platform. The hypervisor manages the logical partitions to assure that they can share needed resources in the computer system while maintaining the separate computing environments defined by the logical partitions.

Processes on computer systems today are generally at the mercy of an uncorrectable memory error. When such an error occurs, the process or the entire partition itself must be terminated since a load instruction cannot be completed. Furthermore, the frequency of such errors appears to be exacerbated by newer, denser memory chips with smaller dies and faster clocks. Prior solutions to address this situation usually involve identifying a bad area of memory or affected area via a high frequency of correctable errors and attempting to deactivate the bad memory area the next time the partition is powered off. This solution can leave a critical system operating with a potential fatal error until it can be shut down for maintenance. Alternately, the OS can try to dynamically free up the memory that is incurring the correctable errors, but the OS may not be able to free up memory if it contains critical operating systems processes or data. In any case, it is preferable to address the problem memory before the correctable error becomes an uncorrectable error and the process or partition must be terminated.

In some systems, memory mirroring is used to overcome memory errors. Memory mirroring involves maintaining alternate copies of memory contents in two different regions of memory. When an uncorrectable data error is detected, the second copy is accessed, thus avoiding loss of data. A memory controller or equivalent device must be able to access the backup memory region when an error is detected in the first memory region. This type of access for retrieving a backup memory copy responsive to a detected error is commonly referred to as a mirror failover read. See for example U.S. Pat. No. 7,328,315 to Hillier et al. While mirrored memory provides a more robust memory system, there may be memory errors in the mirrored memory or a combination of the main memory and the mirrored memory.

Shutting down the computer system to prevent system failure from correctable and uncorrectable memory errors is a costly and inefficient solution. Without a way to transparently handle recurring correctable errors and uncorrectable errors, it will continue to be necessary to shut down complex computer systems to deal with correctable memory errors before the memory errors become uncorrectable and cause the system to fail.

BRIEF SUMMARY

The disclosure and claims herein are directed to transparently handling recurring correctable errors and uncorrectable errors in a mirrored memory system to prevent costly system shutdowns for correctable memory errors or system failures from uncorrectable memory errors. When a high number of correctable errors are detected for a given memory location, the hypervisor moves the data associated with the memory location to an alternate physical memory location transparently to the partition such that the partition has no knowledge that the physical memory actualizing the memory location has been changed. When an uncorrectable error occurs, the memory relocation mechanism uses data from a partner mirrored memory block as a data source for the memory block with the uncorrectable error and then relocates the data to a newly allocated memory block to replace the memory block with the uncorrectable error. In the described example, the correct data is provided by the memory hardware when the relocation mechanism reads the uncorrectable error.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION 1.0 Overview

The disclosure and claims herein relate to logical memory in logically partitioned computer systems. For those not familiar with the concepts of logical partitions, this Overview section will provide background information that will help to understand the disclosure and claims herein.

Figure 2:
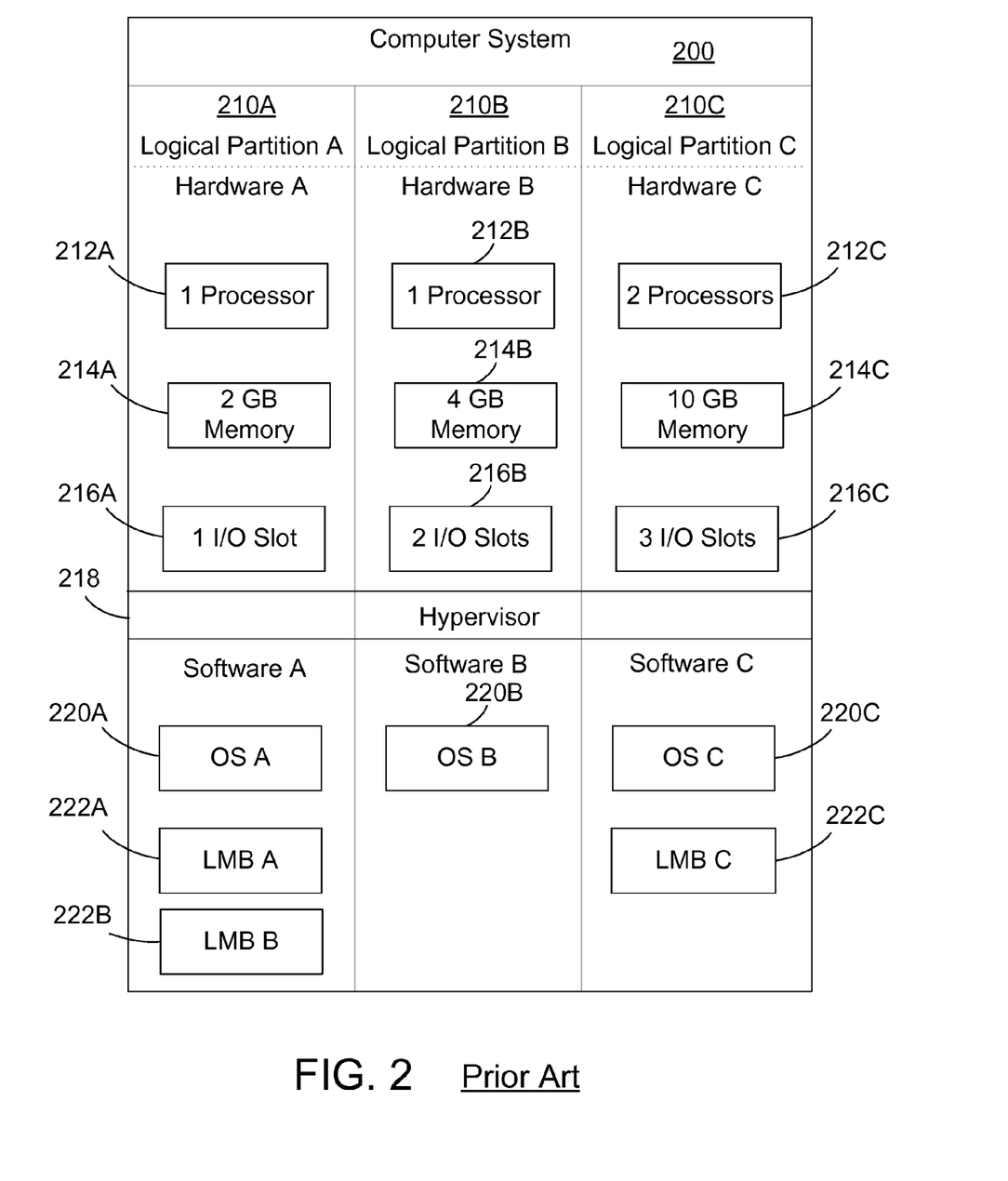
FIG. 2 is a block diagram of a prior art partitioned computer system.

As stated in the Background Art section above, a computer system may be logically partitioned to create multiple virtual machines on a single computer platform. For an example, we assume that we create a sample computer system to include four processors, 16 GB of main memory, and six I/O slots. Note that there may be many other components inside the sample computer system that are not shown for the purpose of simplifying the discussion herein. We assume that our sample computer system 200 is configured with three logical partitions 210A-C, as shown in FIG. 2. The first logical partition 210A is defined to have one processor 212A, 2 GB of memory 214A, and one I/O slot 216A. The second logical partition 210B is defined to have one processor 212B, 4 GB of memory 214B, and 2 I/O slots 216B. The third logical partition 210C is defined to have two processors 212C, 10 GB of memory 214C, and three I/O slots 216C. Note that the total number of processors 210A+210B+210C equals the four processors in the computer system. Likewise for the memory and I/O slots.

A hypervisor (or partition manager) 218 is a firmware layer that is required for a partitioned computer to interact with hardware. The hyperviser 218 manages logical memory blocks (LMBs) and the logical partitions to assure that they can share needed resources in the computer system while maintaining the separate computing environments defined by the logical partitions. With hardware resources allocated to the logical partitions, software is installed as shown in FIG. 2. An operating system is installed in each partition, followed by utilities or applications as the specific performance needs of each partition require. The operating systems, utilities and applications are installed in one or more logical memory blocks (LMBs). Thus, for the example in FIG. 2, the first logical partition 210A includes an operating system in a first LMB 220A, and two additional LMBs 222A, 222B. The second logical partition 210B includes an operating system LMB 220B. The third logical partition 210C includes an operating system LMB 220C, and another LMB C 222C.

2.0 Detailed Description

The claims and disclosure herein provide a method and apparatus for transparent correctable error handling in a partitioned computer system.

Figure 1:
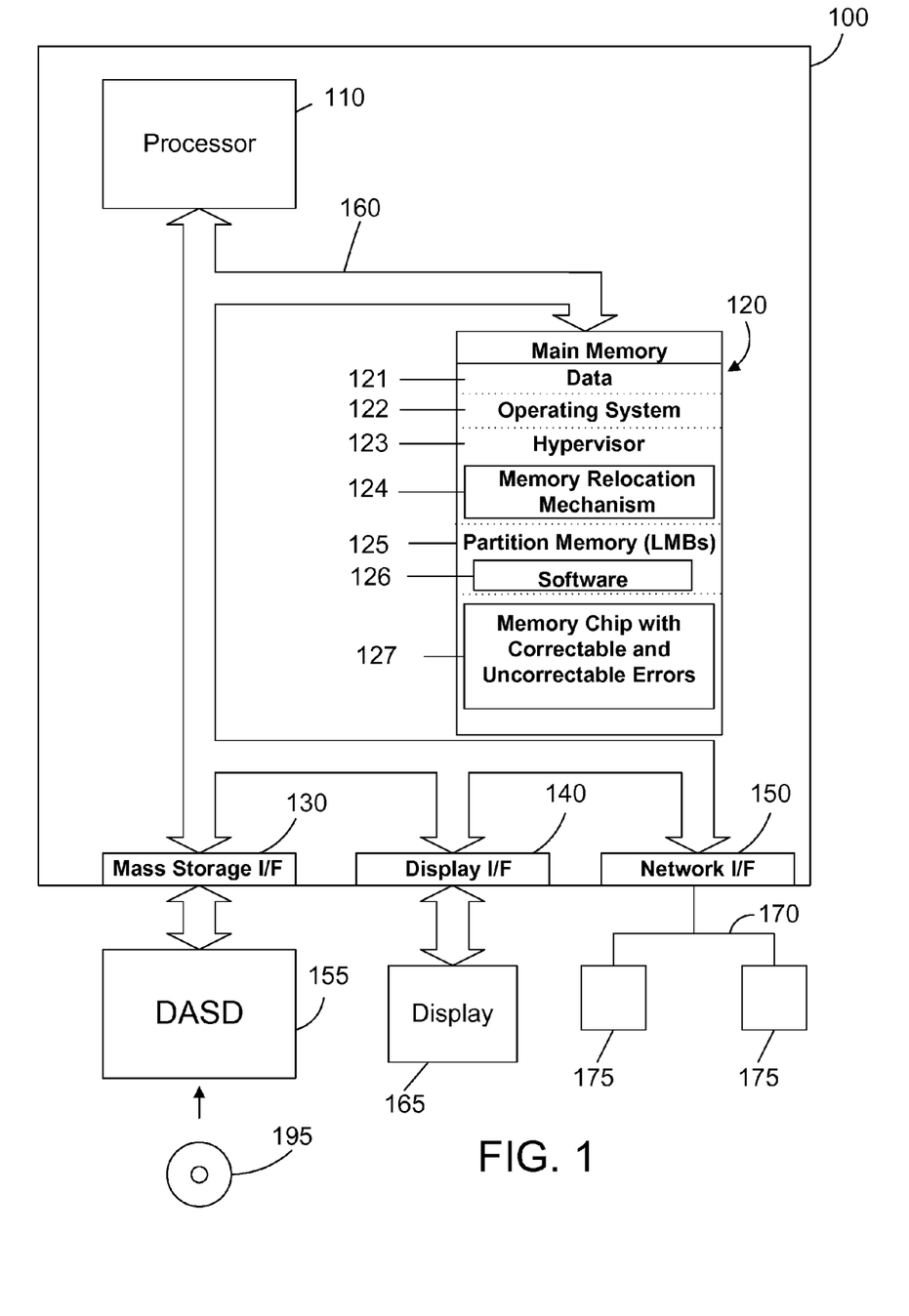
FIG. 1 is a block diagram of an apparatus with a memory relocation mechanism for transparent correctable error handling in a partitioned computer system.

Referring to FIG. 1, a computer system 100 is one suitable implementation of a computer system that includes a memory relocation mechanism to facilitate efficient relocation of LMBs in partitioned memory. Computer system 100 is an IBM eServer computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121 and an operating system 122. Data 121 represents any data that serves as input to or output from any program in computer system 100. Operating system 122 is a multitasking operating system known in the industry as eServer OS; however, those skilled in the art will appreciate that the spirit and scope of this disclosure is not limited to any one operating system. The memory further includes a hypervisor 123 that contains a memory relocation mechanism 124, a partition memory 125 with software 126, and a portion of memory that is characterized as a memory chip with correctable and uncorrectable errors 127. Each of these entities in memory is described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, hypervisor 123, memory relocation mechanism 124, partition memory 125, software 126, and the memory chip with correctable and uncorrectable errors 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a memory relocation mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the memory migration mechanism described herein may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

Figure 3:
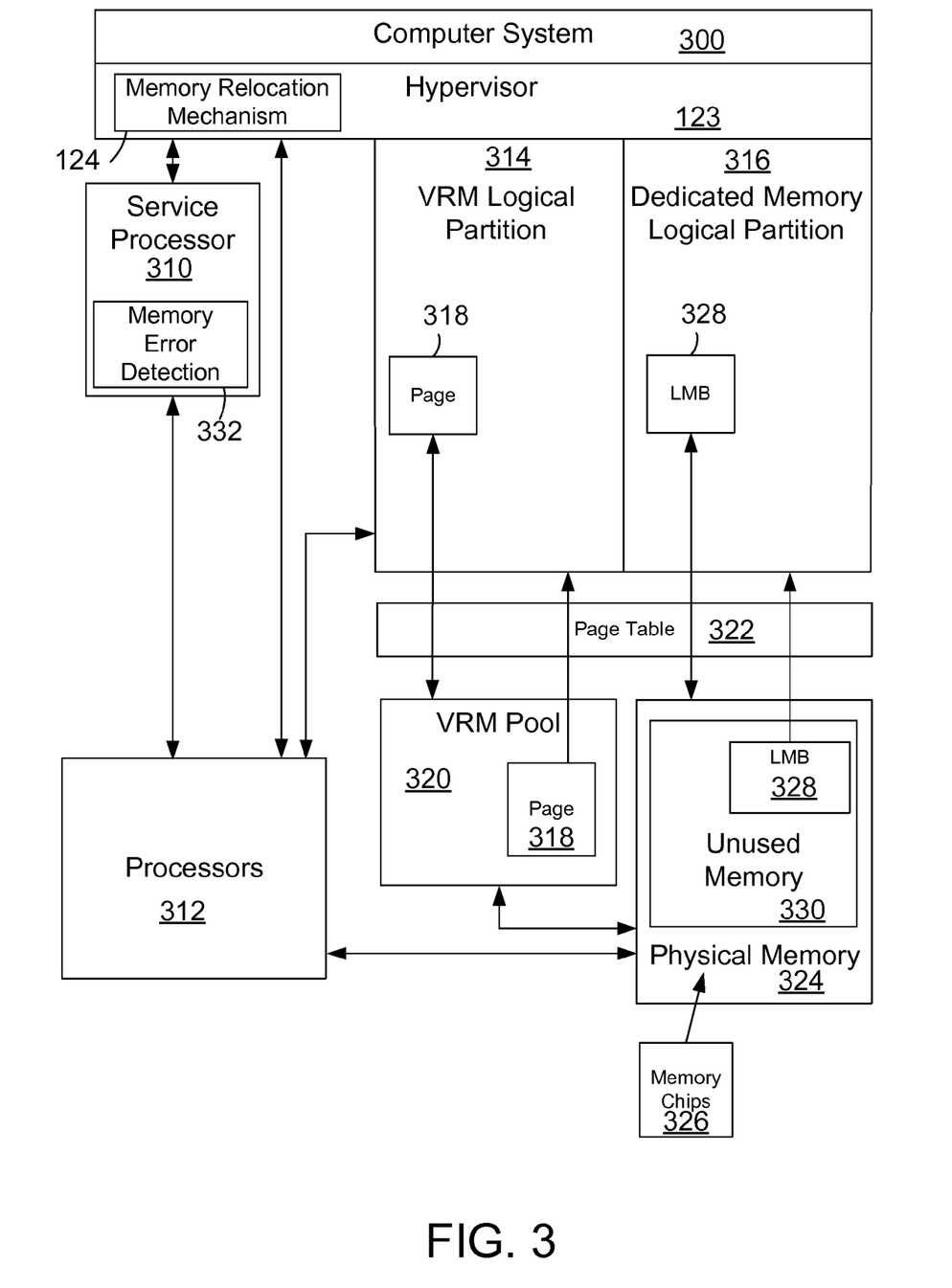
FIG. 3 is a block diagram of virtual partitioned memory in a partitioned computer system with transparent correctable error handling.

FIG. 3 is a block diagram of a logically partitioned computer system that supports transparent correctable error handling. FIG. 3 represents a portion of a computer system 300 that may include the other features of a partitioned computer system as described above with reference to FIGS. 1 and 2. Computer system 300 includes a hypervisor 123 that allocates memory to the logical partitions and handles memory access to the logical memory. The hypervisor 123 communicates with a service processor 310 and the processors 312. A memory relocation mechanism 124 is located within the hypervisor 123 or operates in conjunction with the hypervisor to provide the relocation of the memory as described further below. The service processor 310 monitors the processors for abnormal conditions and notifies the hypervisor 123. The logical partition memory is divided into a virtual real memory (VRM) logical partition 314 and a dedicated memory logical partition 316. The VRM logical partition is allocated a number of pages 318 by the hypervisor 123 from the VRM pool 320. The page table 322 records the real memory addresses for each page 318 in physical memory 324. Similarly, the dedicated memory logical partition 316 is allocated a number of LMBs 320 by the hypervisor 123 from the physical memory 324. The page table 322 also records the real memory addresses for each LMB 328 in physical memory 324.

The physical memory 324 comprises a number of physical memory chips 326. The physical memory 324 includes the unused memory 330. The unused memory 330 may include memory that has not been assigned and capacity upgrade on demand memory (CUoD). CUoD memory is memory that is installed on a user's machine but is not activated until the user pays for an upgrade to use the memory. As described herein, the CUoD memory may be used to replace bad memory without the customer's knowledge or without the customer needing to purchase the memory.

Again referring to FIG. 3, the service processor 310 includes a memory error detection mechanism 332. The memory error detection mechanism 332 may also reside in the processors 312. The memory error detection mechanism 332 comprises hardware and software that detect and record the number of correctable errors that occur in the memory chips 326 as known in the prior art. When the number of correctable errors reaches a threshold, the memory relocation mechanism 124 in the hypervisor 123 is activated to transparently relocate the contents of the memory page or LMB associated with the affected memory chip to a new physical memory location as described herein.

Figure 4:
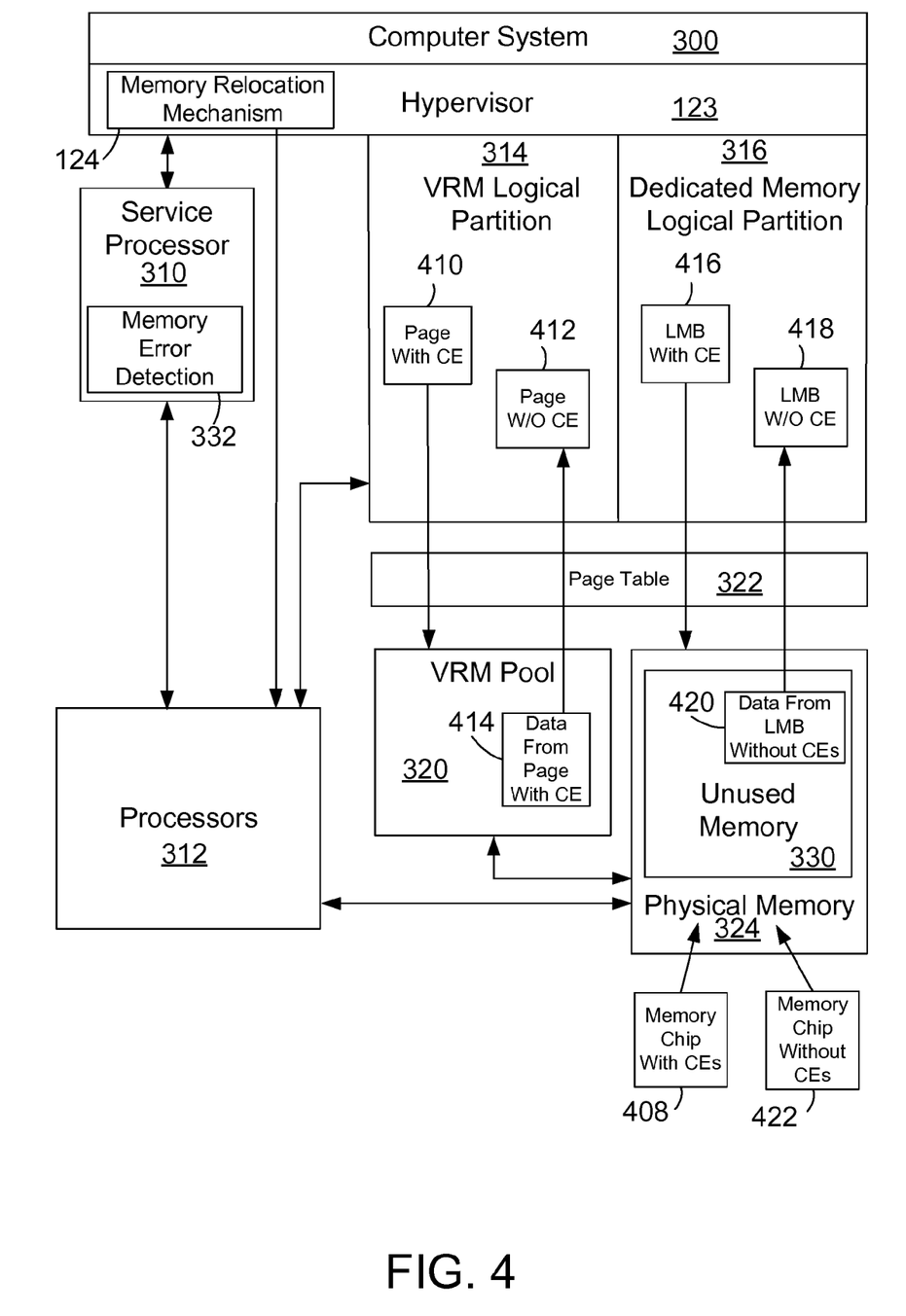
FIG. 4 is another block diagram of a virtual partitioned memory in a partitioned computer system with transparent correctable error handling.

FIG. 4 shows additional detail of the logically partitioned computer system 300 described above with reference to FIG. 3. FIG. 4 shows an example of relocating memory in a logically partitioned computer system for transparent correctable error handling. We will first consider an example of relocating a page of memory in a VRM logical partition 314. The memory error detection mechanism 332 detects a number of correctable memory errors in a memory chip 408 that is associated with a page 410 in the VRM logical partition 314. The memory relocation mechanism 124 in the hypervisor 123 is activated by the error detection mechanism 332 when the error is above a predetermined threshold. If necessary, the memory relocation mechanism 124 places the processors 312 in virtual partition memory (VPM) mode so that the memory relocation mechanism 124 will have control of all memory storage through the page table 322. In the IBM eServer machine used for this example, access to a VRM logical partition is always done in VRM mode, so there is no need for this step for a VRM logical partition. The memory relocation mechanism places the page with the correctable errors 410 in the VRM pool 320 and allocates a new page 412 to the VRM logical partition 314. The new page 412 is associated with a memory chip that does not have correctable errors 422. The memory relocation mechanism then copies the data 414 from the page with the correctable errors to the newly allocated page without correctable errors 412. The page table is updated to reflect the new location of the page 412 to complete the transparent relocation of the page in the VRM logical partition 314.

Again referring to FIG. 4, we next consider an example of relocating a LMB in a dedicated memory logical partition 316. Similar to the previous example, the memory error detection mechanism 332 detects a number of correctable memory errors in a memory chip 408 that is associated with a LMB 416 in the dedicated memory logical partition 316. The memory relocation mechanism 124 in the hypervisor 123 is activated by the error detection mechanism 332 when the error is above a predetermined threshold. The memory relocation mechanism 124 places the processors for the dedicated memory logical partition 316 having the LMB 416 with correctable errors in virtual partition memory (VPM) mode so that the memory relocation mechanism 124 will have control of all memory storage through the page table 322. In VPM mode, the hypervisor gets control of data storage and instruction storage interrupts. Hypervisor resources are used to present these interrupts to the hypervisor. The memory relocation mechanism places the LMB with the correctable errors 416 in the unused memory 330 and allocates a new LMB 418 to the dedicated memory logical partition 316. The memory relocation mechanism 124 then copies the data 420 from the LMB with the correctable errors to the newly allocated LMB without correctable errors 418. The page table 322 is updated to reflect the new location of the page 412. The memory relocation mechanism 124 then takes the processors out of VPM mode to complete the transparent relocation of the page in the dedicated memory logical partition 316.

Figure 5:
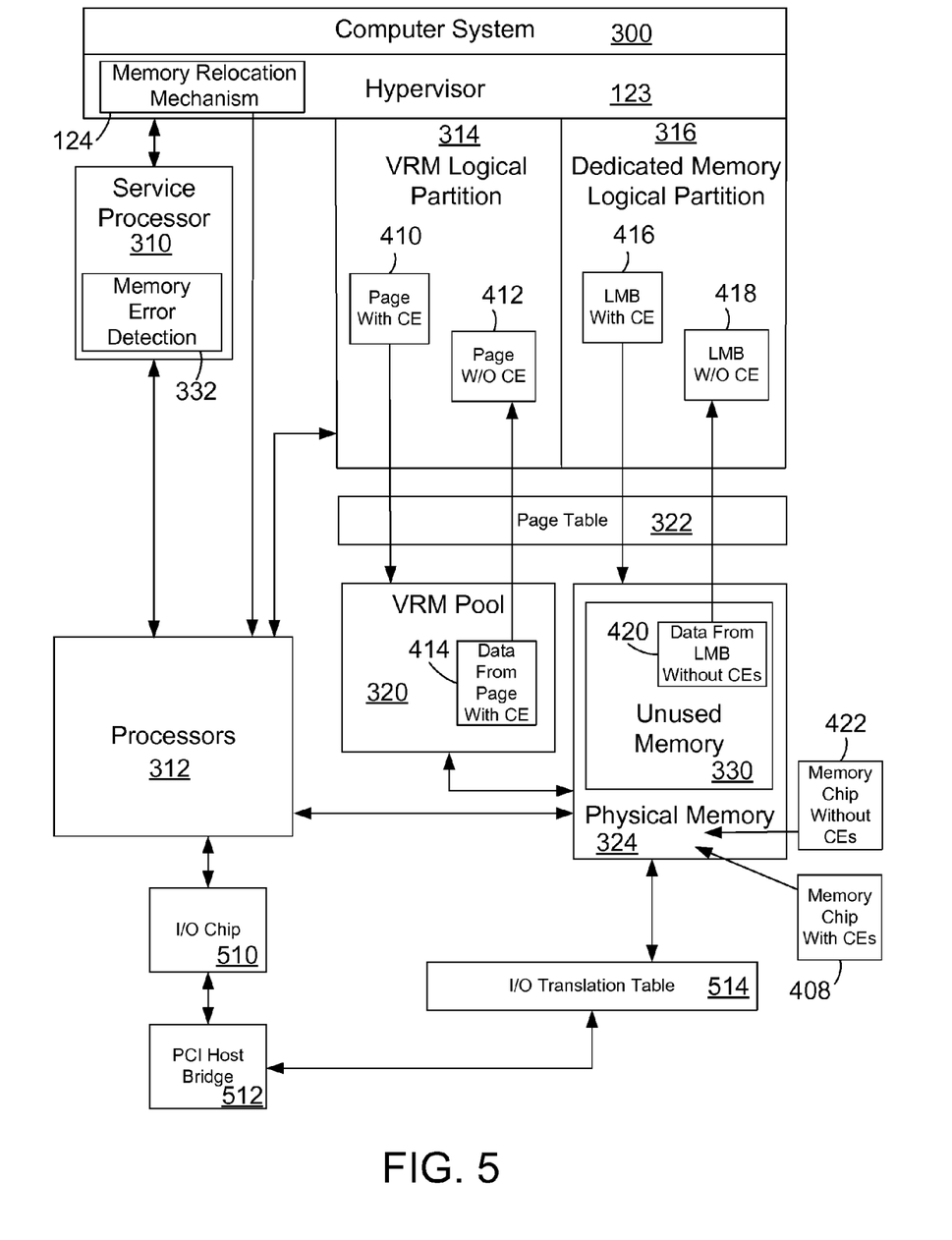
FIG. 5 is another block diagram of a virtual partitioned memory in a partitioned computer system with transparent correctable error handling for DMA transfers.

Transparent relocation of memory as described herein can also be done where the memory is accessed by direct memory access (DMA). DMA access to memory in a logically partitioned computer system may be accomplished as illustrated in FIG. 5. The processors 312 communicate through an I/O chip 510 to a bus bridge, which in the illustrated example is a PCI host bridge 512. The PCI host bridge 512 then communicates through an I/O translation table 514 to the physical memory 324. The access to memory through the I/O translation table is analogous to the access through the page table 322 described above. During relocation of memory as described above, the memory relocation mechanism must insure that arbitration into the affected memory (memory with the high number of correctable errors) is disabled before relocation of the memory contents. The arbitration access to the affected LMB is disabled at the hypervisor so that no new DMAs are initiated to the affected memory. Further, any existing DMAs to the logical partition memory are flushed. If a processor tries to access an LMB page or fetch instructions while the page relocation is in progress, it will get a data/instruction storage interrupt and will spin waiting for the relocation operation to complete. Where the DMAs access the logical memory through an I/O translation table 514, the entries in the I/O translation table must be updated for the relocation in the same manner as described above for the page table.

Figure 6:
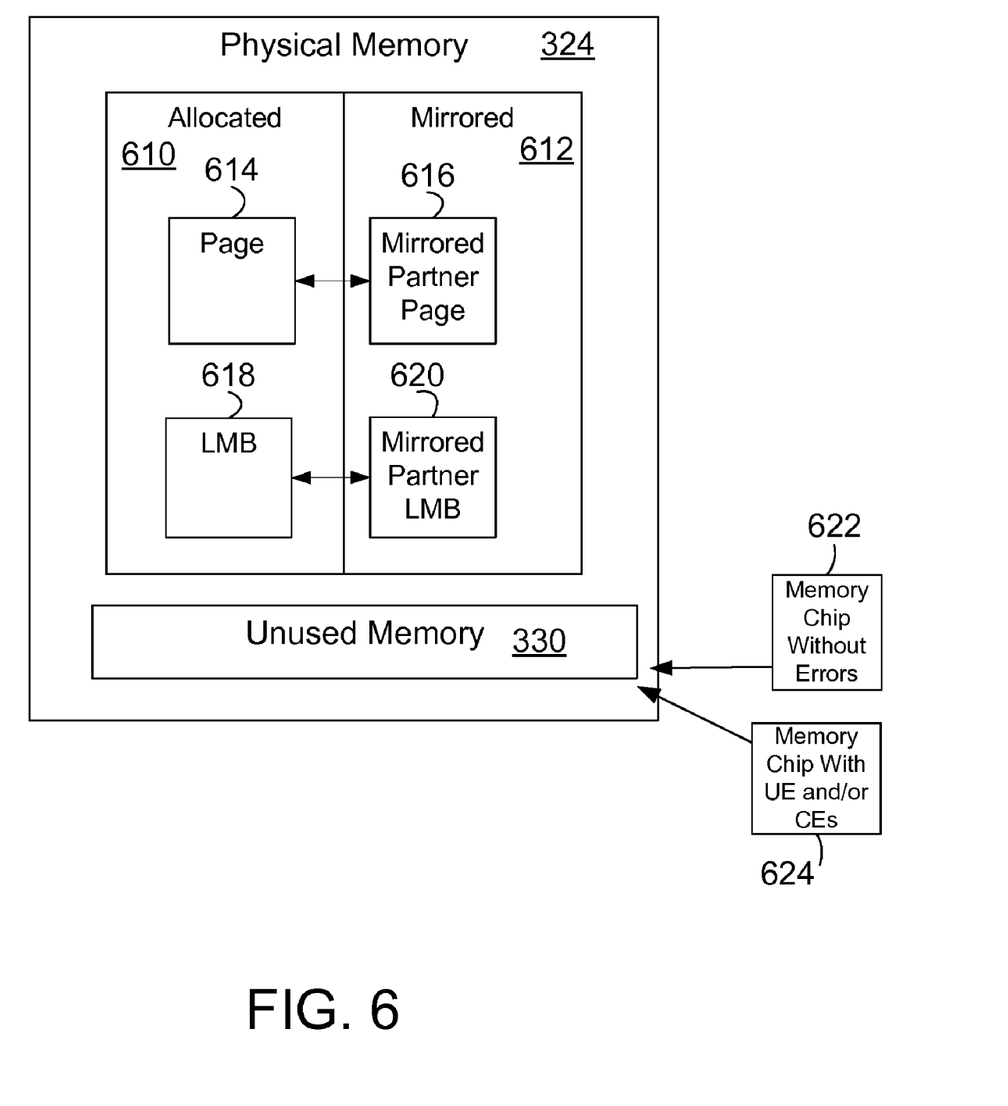
FIG. 6 shows a physical memory block to illustrate allocated memory and mirrored memory.

FIG. 6 shows a physical memory block 324 similar to that described above. In this example, physical memory block 324 includes unused memory 330 as described above, allocated memory 610 and mirrored memory 612. Each page 614 in allocated memory 610 has a partner mirrored page 616 in mirrored memory. Similarly, each LMB 618 in allocated memory 610 has a mirrored partner LMB 620 in mirrored memory 612. The pages and LMBs in allocated memory are used in the logical partitions as described above. The mirrored memory 612 contains data that is a copy of data stored in allocated memory 610 as taught in the prior art except as described herein. The physical memory is made up of memory chips without memory errors 622 and memory chips that have uncorrectable and/or correctable errors 624. Thus the pages and LMBs may be found to contain one or more of these errors. When memory errors are detected, the errors are corrected or repaired as described herein. A correctable or uncorrectable error in allocated memory can be repaired as described herein. Further, correctable errors occurring in mirrored memory can similarly be overcome. In those cases where there is an uncorrectable error occurring in a memory page or LMB and also in the mirrored partner page or LMB the error cannot be repaired.

Figure 7:
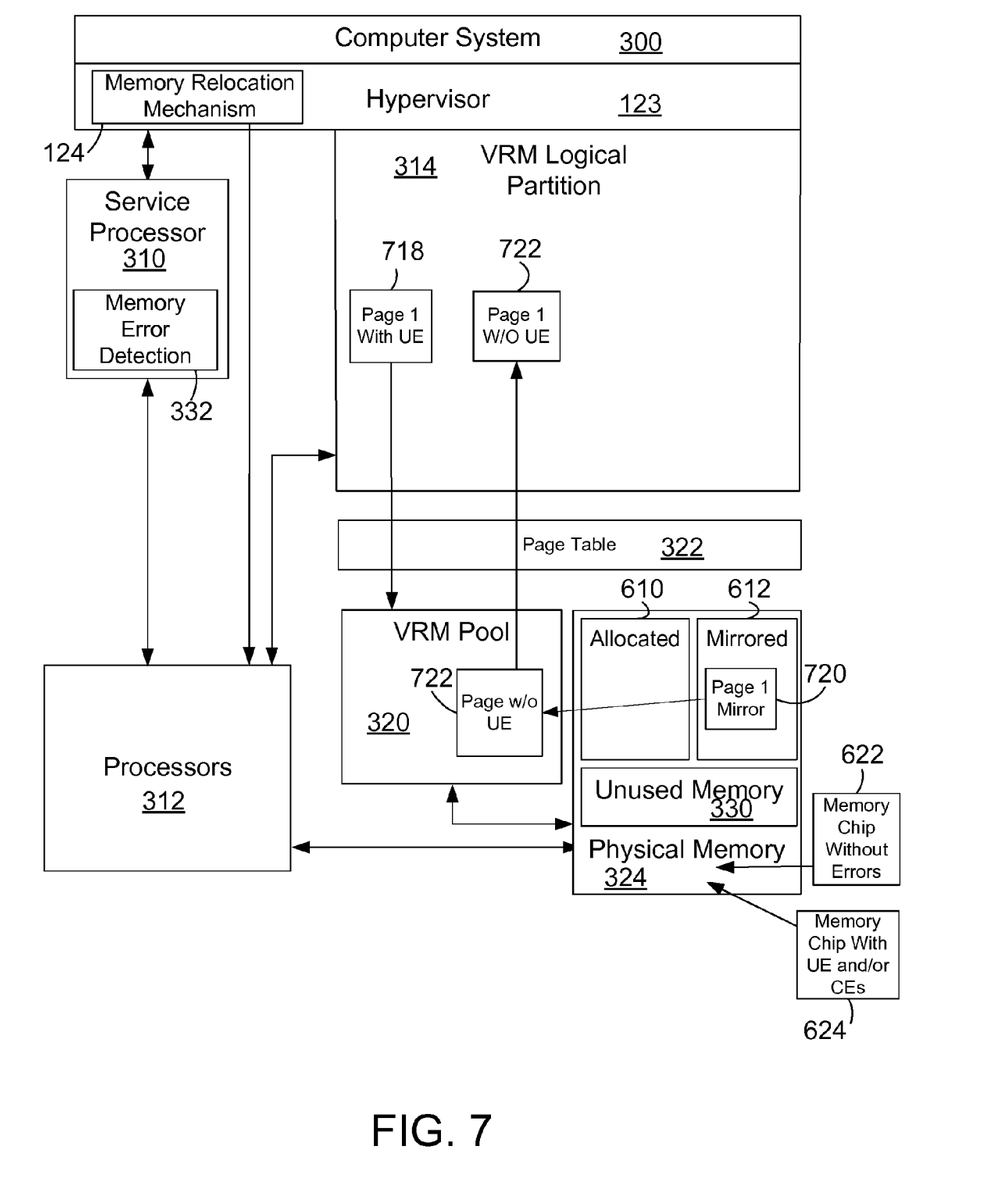
FIG. 7 is a block diagram of a virtual partitioned memory in a partitioned computer system with transparent error handling for uncorrectable errors using mirrored memory.

FIG. 7 shows a logically partitioned computer system 300 as described above with reference to FIGS. 3-6. FIG. 7 gives further detail for an example of relocating memory in a logically partitioned computer system for transparent error handling of both correctable and uncorrectable errors using mirrored memory. The feature of a mirrored memory can be combined with both the VRM logical partition and the dedicated memory logical partition described above. However, FIG. 7 only illustrates relocating a page of memory in a VRM logical partition 314 for simplicity. In this example, the physical memory 324 that is not part of the unused memory 330 is allocated memory 610 or mirror memory 612 as described above.

Again referring to the example shown in FIG. 7, the memory error detection mechanism 332 monitors access to physical memory 324 to detect the occurrence of correctable and uncorrectable memory errors. If a correctable error is detected by the memory detection mechanism for a memory access to a physical memory chip, then the error is processed to determine if the error is above a threshold. If the correctable errors occur above a threshold, then the memory relocation mechanism 124 in the hypervisor 123 is activated by the error detection mechanism 332 to transparently relocate the data of the memory block associated with the memory chip to a newly allocated memory block in the manner described above. In addition, when the memory error detection mechanism 332 determines an uncorrectable error occurs in a memory chip 624 that is associated with Page 1 718 in the logical partition 314 and at the same time there is no uncorrectable error in the partner mirrored memory block, the memory relocation mechanism uses data from a partner mirrored memory block 720 as a data source to replace the data that was lost by the uncorrectable error. The memory relocation mechanism obtains the correct data to replace the memory block with the correctable error by accessing the memory. The memory hardware that maintains the mirrored memory provides the correct data from either the regular memory or mirrored memory partner as known in the prior art. The memory relocation mechanism then relocates the data to a newly allocated memory block 722 from the VRM Pool 320 to replace Page 1 718 with Page 1 722 in the VRM logical partition 314.

Again referring to FIG. 7, handling correctable errors may requires some of the above steps depending on the type of logical partition. For instance, for memory errors in the VRM logical partition 314, it may be necessary for the memory relocation mechanism 124 to place the processors 312 in virtual partition memory (VPM) mode so that the memory relocation mechanism 124 will have control of all memory storage through the page table 322 as described above.

Figure 8:
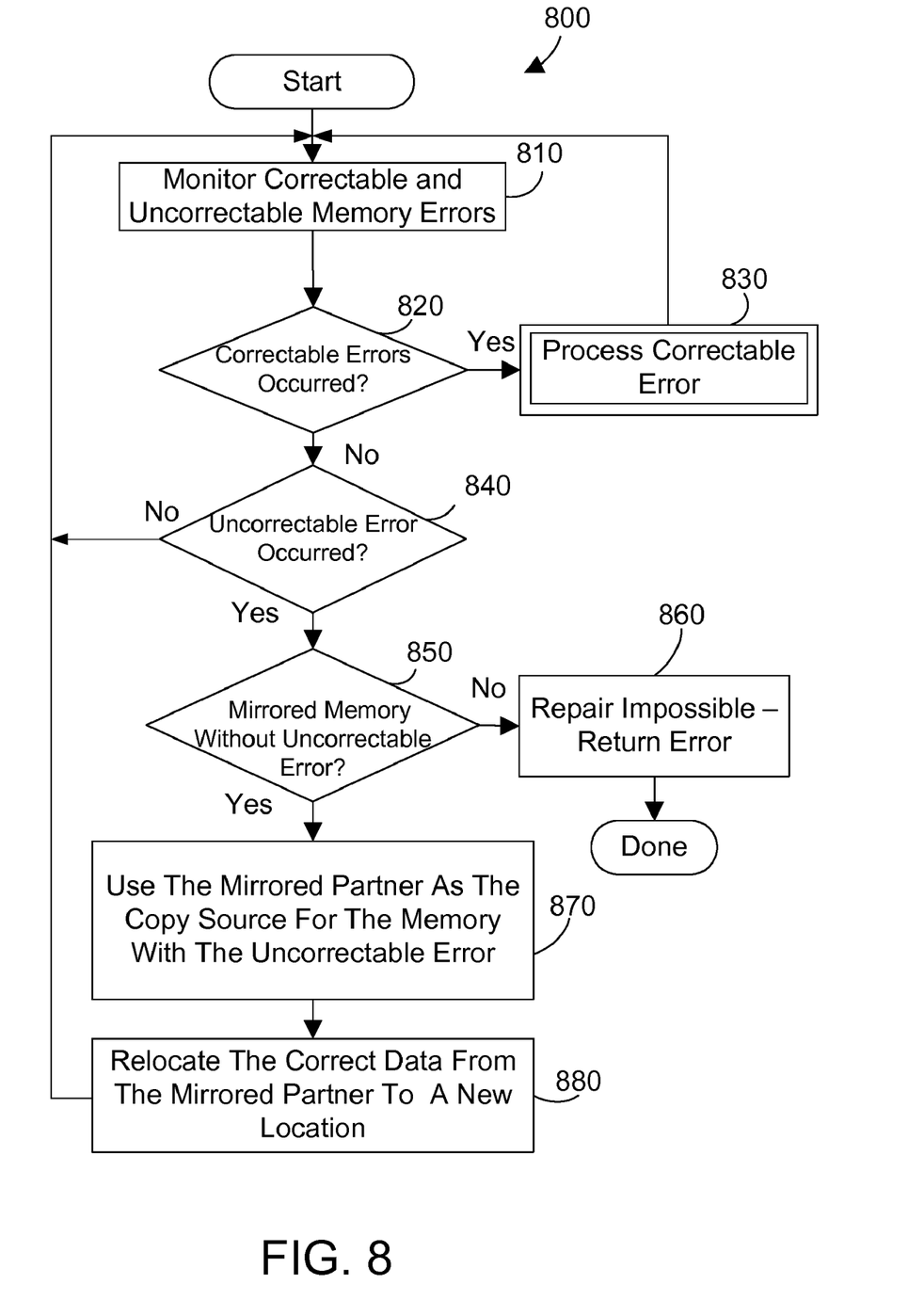
FIG. 8 is a method flow diagram that illustrates a method for transparent correctable error handling in a partitioned computer system.

FIG. 8 shows a method 800 for transparently handling correctable and uncorrectable errors in a partitioned computer system. The steps in method 800 are preferably performed by the memory relocation mechanism 124 in the Hypervisor 123 shown in FIG. 1. First, monitor the occurrence of correctable and uncorrectable errors (step 810). If a correctable error occurs (step 820=yes) then process the correctable error (determine if the correctable errors that have occurred at that memory location are above a threshold, and is so relocate the memory) (step 830). If there is no correctable error (step 820=no) and there are no uncorrectable errors (step 840=no) then continue to monitor the errors (step 810). If there is an uncorrectable error (step 840=yes) then check if the uncorrectable error is at a memory location that has a mirrored page (step 850). If the uncorrectable error is at a memory location that does not have a mirrored memory partner without an uncorrectable error (step 850=no) then return an error to indicate that recovery from the error is impossible (step 860) and the method is then done. If the uncorrectable error is at a memory location that has a mirrored memory partner without an uncorrectable error (step 850=yes) then use the mirrored memory partner as the copy source to repair the memory with the uncorrectable error (step 870) by relocating the correct data from the mirrored partner to a new location (step 880). The method then continues with monitoring the memory errors (step 810).

Figure 9:
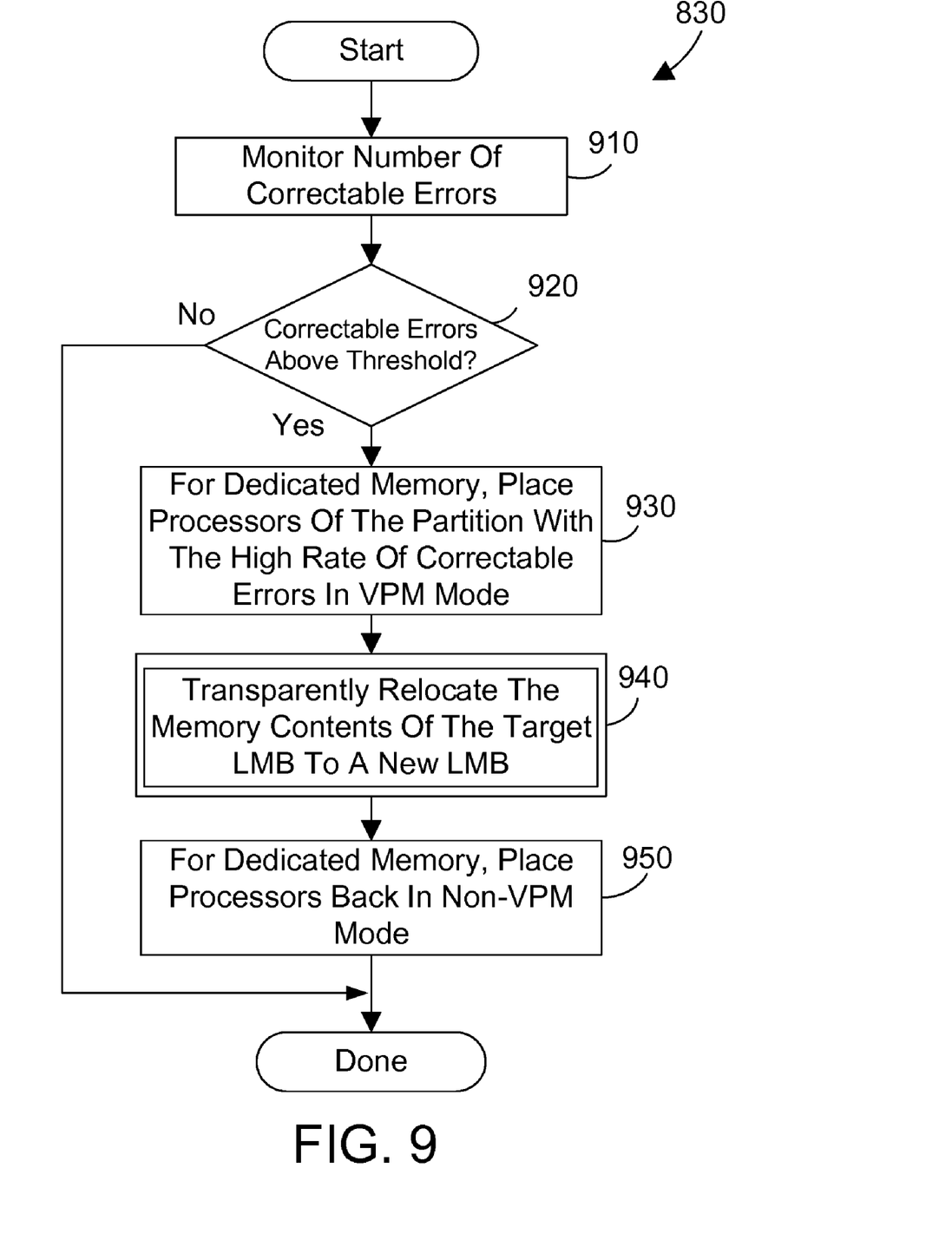
FIG. 9 is a method flow diagram that illustrates a possible implementation of step 830 in FIG. 8.

FIG. 9 shows a method 830 for transparently handling recurring correctable errors in a partitioned computer system. The steps in method 830 are preferably performed by the memory relocation mechanism 124 in the Hypervisor 123 shown in FIG. 1. First, monitor the number of correctable errors (step 910) and determine if there are correctable errors at a memory location above a threshold (step 920). If there are not correctable errors above a threshold (step 920=no) then the method is done and the method returns to method 800 to proceed with memory operations in the partition. If there are correctable errors above a threshold in a portion of memory (step 920=yes), then for dedicated memory, place the processors of the partition with the high rate of correctable errors in VPM mode (step 930). Then transparently relocate the memory contents of the target LMB to a new LMB (step 940). Finally, for dedicated memory, place the processors back in non-VPM mode (step 950). The method is then done.

Figure 10:
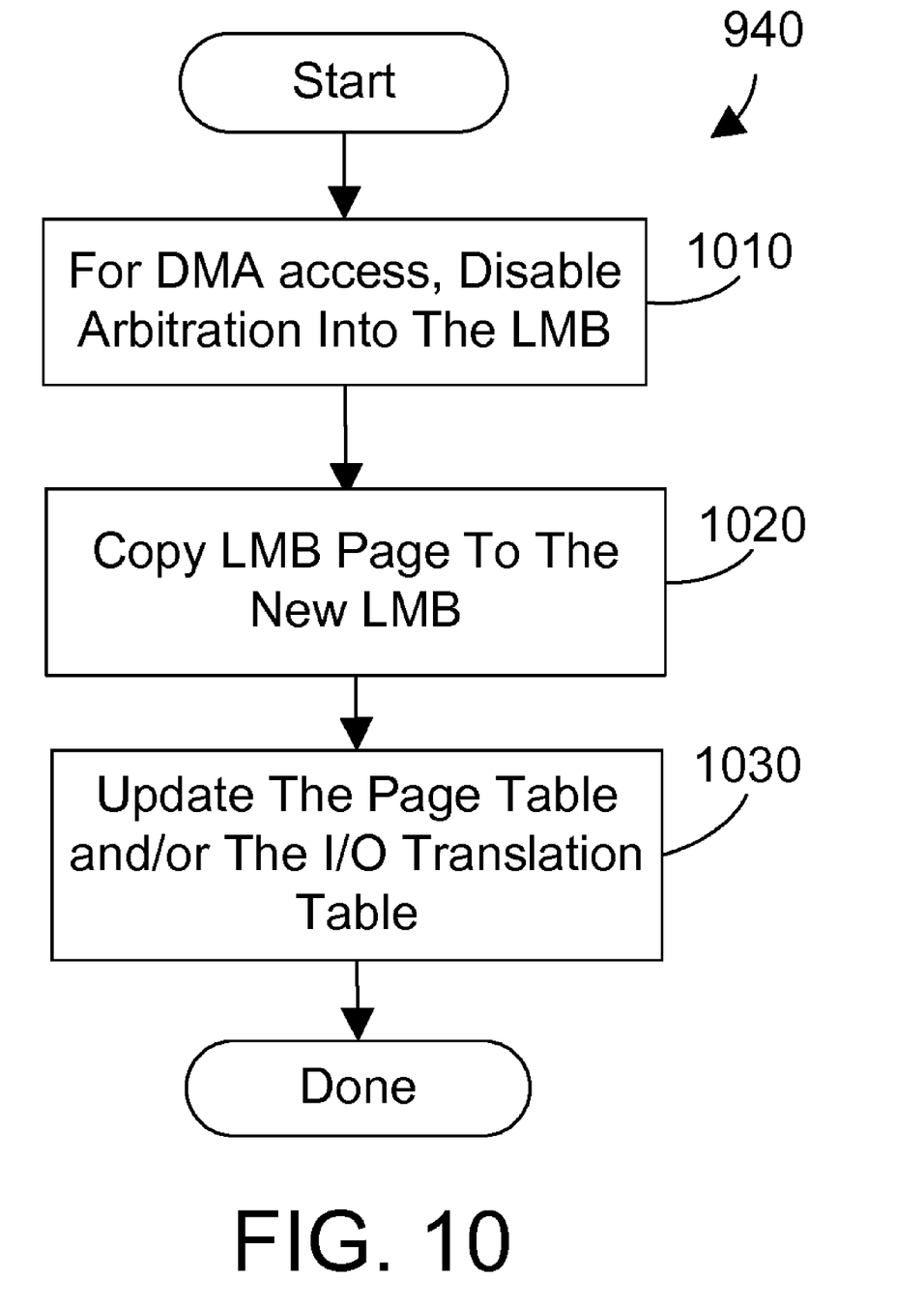
FIG. 10 is method flow diagram that illustrates a possible implementation of step 940 in FIG. 9.

FIG. 10 shows a method 940 to transparently relocate the memory contents of the target LMB to a new LMB. Method 940 is one suitable implementation for step 940 in FIG. 9. First, for DMA access to the affected memory, disable arbitration into the LMB where the memory errors occurred (step 1010). Copy the LMB page to the new LMB (step 1020). Finally, update the page table (for regular memory access) or the I/O translation table (for DMA access) with the new LMB information (step 1030). The method is then done.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A logically partitioned computer system comprising:
   a plurality of processors;
   a memory coupled to the plurality of processors having a plurality of logical partitions designated by a partition manager;
   a first logical partition with an operating system;
   a memory block with a mirrored memory partner block having the same data in the first logical partition where the memory block and the mirrored memory partner block are allocated on physical memory chips;
   a memory error detection mechanism that monitors the occurrence of correctable and uncorrectable memory errors in the physical memory chips;
   when the memory error detection mechanism determines a number of correctable memory errors above a predetermined threshold occur in the first logical partition when accessing one of the physical memory chips that contains a memory block, a memory relocation mechanism in a hypervisor relocates transparently to the operating system data from the memory block to a first newly allocated memory block, wherein the memory relocation mechanism relocates dedicated memory by placing the processors of the first logical partition with the correctable memory errors above the predetermined threshold in a virtual partition memory mode, disabling arbitration into the memory block for direct memory access, copying the memory block page to a new memory block, and updating a page table; and
   when the memory error detection mechanism determines an uncorrectable error occurs in the memory block and when there is a mirrored memory partner block with no uncorrectable errors, the memory relocation mechanism uses the mirrored memory partner block as a data source for data for the memory block with the uncorrectable error and then relocates the data to a second newly allocated memory block to replace the memory block with the uncorrectable error.

2. The logically partitioned computer system of claim 1 wherein the memory block is a page in a virtual real memory logical partition.

3. The logically partitioned computer system of claim 1 wherein the memory block is a logical memory block (LMB) of a dedicated memory logical partition.

4. The logically partitioned computer system of claim 1 wherein the relocated data is operating system software.

5. The logically partitioned computer system of claim 1 wherein the memory relocation mechanism flushes running direct memory accesses (DMAs) before relocating the data.

6. A computer-implemented method for transparently relocating partition memory, the method comprising the steps of:
   (A) providing a memory relocation mechanism in a hypervisor that manages a plurality of partitions with a first logical memory partition having an operating system, wherein the memory relocation mechanism performs the following steps:
   (B) monitoring the occurrence of correctable and uncorrectable errors in memory chips associated with a memory block in the first logical memory partition where the memory block has a partner mirrored memory block;
   (C) where the occurrence of correctable errors in the memory block is above a pre-determined threshold, performing the steps of:
      (1) for dedicated memory, placing processors with the correctable memory errors above the predetermined threshold of the first logical memory partition in virtual partition memory (VPM) mode to allow the hypervisor to control all access to the logical memory partition;
      (2) transparent to the operating system relocating the contents of the memory block to a first newly allocated memory block associated with a memory chip without memory errors;
      (3) for dedicated memory, placing processors of the logical memory partition in non-VPM mode; and
   (D) on the occurrence of an uncorrectable error in the memory block and when there is a mirrored memory partner block without an uncorrectable error, using the mirrored memory partner block as a data source for data that was lost by the uncorrectable error and then relocating the data to a second newly allocated memory block to replace the memory block with the uncorrectable error.

7. The method of claim 6 wherein the memory block is a logical memory block (LMB).

8. The method of claim 7 further comprising the steps of:
   copying data from the memory block to a newly allocated LMB; and
   updating a page table.

9. The method of claim 7 further comprising the steps of:
   disabling arbitration into the LMB;
   flushing running direct memory accesses (DMAs) and updating an I/O translation table.

10. A method for deploying computing infrastructure, comprising integrating computer readable code into a computing system, wherein the code in combination with the computing system perform the method of claim 6.

11. A computer-implemented method for transparently relocating partition memory, the method comprising the steps of:
    (A) providing a memory relocation mechanism in a hypervisor that manages a plurality of partitions with a first logical memory partition having an operating system, wherein the memory relocation mechanism performs the following steps:
    (B) monitoring the occurrence of correctable errors in memory chips associated with a memory block in the first logical memory partition where the memory block has a partner mirrored memory block;
    (C) where the occurrence of correctable errors in the memory block is above a pre-determined threshold, performing the steps of:

(1) placing processors with the correctable memory errors above the predetermined threshold of the first logical memory partition in virtual partition memory (VPM) mode to allow the hypervisor to control all access to the logical memory partition;
(2) transparent to the operating system relocating the contents of the memory block to a newly allocated memory block associated with a memory chip without memory errors comprising the steps of:
   (a) copying data from the memory block to the newly allocated LMB;
   (b) updating a page table;
(D) where the access to memory is direct memory access (DMA), disabling arbitration into the LMB, flushing running DMAs and updating an I/O translation table; and
(E) with the occurrence of a uncorrectable error in the memory block and when there is a mirrored memory partner block without an uncorrectable error, using the mirrored memory partner block as a data source for data for the memory block with the uncorrectable error and then relocating the data to a second newly allocated memory block to replace the memory block with the uncorrectable error.

12. An article of manufacture comprising:

a memory error detection mechanism in a hypervisor that manages a plurality of partitions with a first logical memory partition having an operating system, where the memory error detection mechanism that monitors the occurrence of correctable and uncorrectable memory errors when accessing a memory chip associated with a logical memory block (LMB) of the first logical memory partition in a computer system with multiple processors and where the LMB has a mirrored memory partner block having the same data where the LMB and the partner mirrored memory block are allocated on physical memory chips;

when the memory error detection mechanism determines a number of correctable memory errors above a predetermined threshold occur while accessing the memory chip, a memory relocation mechanism transparent to the operating system relocates data of the LMB to a first newly allocated memory block, wherein the memory relocation mechanism transparently relocates dedicated memory by placing the processors of the partition with the correctable memory errors above the predetermined threshold in a virtual partition memory mode, disabling arbitration into the memory block for direct memory access, copying the memory block page to a new memory block, and updating a page table; and when the memory error detection mechanism determines an uncorrectable error occurs in the LMB and at the same time there is a mirrored memory partner block without an uncorrectable error, the memory relocation mechanism uses the mirrored memory partner block as a data source to replace the LMB with the uncorrectable error and then relocates the data to a second newly allocated memory block to replace the LMB with the uncorrectable error; and computer-recordable media bearing the error detection mechanism and the memory relocation mechanism.

13. The article of manufacture of claim 12 wherein the memory relocation mechanism is incorporated in a hypervisor.

14. The article of manufacture of claim 12 wherein the LMB is a page in a virtual real memory logical partition.

15. The article of manufacture of claim 12 wherein the relocated data is operating system software.

16. The article of manufacture of claim 12 wherein the memory relocation mechanism flushes running direct memory accesses (DMAs) before relocating the data.

* * * * *